US010095989B2

(12) United States Patent
Vakhutinsky et al.

(10) Patent No.: US 10,095,989 B2
(45) Date of Patent: Oct. 9, 2018

(54) PRODUCT PRICING OPTIMIZER

(75) Inventors: Andrew Vakhutinsky, Norwood, MA (US); Ngai-Hang Zachary Leung, Cambridge, MA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 874 days.

(21) Appl. No.: 13/303,235

(22) Filed: Nov. 23, 2011

(65) Prior Publication Data

US 2013/0132153 A1     May 23, 2013

(51) Int. Cl.
*G06Q 10/04*     (2012.01)
*G06Q 30/02*     (2012.01)

(52) U.S. Cl.
CPC ......... *G06Q 10/04* (2013.01); *G06Q 30/0283* (2013.01)

(58) Field of Classification Search
CPC ................ G06Q 10/00; G06Q 10/063; G06Q 10/06315; G06Q 10/04; G06Q 30/02
USPC ....................................................... 705/7.29
See application file for complete search history.

(56) References Cited

U.S. PATENT DOCUMENTS

| | | | |
|---|---|---|---|
| 6,553,352 B2 * | 4/2003 | Delurgio et al. | 705/400 |
| 7,240,019 B2 * | 7/2007 | Delurgio et al. | 705/7.31 |
| 7,328,164 B2 * | 2/2008 | Krikler et al. | 705/14.1 |
| 7,523,047 B1 * | 4/2009 | Neal et al. | 705/7.35 |
| 7,617,119 B1 | 11/2009 | Neal et al. | |
| 7,672,866 B2 * | 3/2010 | Venkatraman et al. | 705/7.35 |
| 7,680,686 B2 * | 3/2010 | Tellefsen et al. | 705/7.31 |
| 7,739,204 B1 | 6/2010 | Cranner et al. | |
| 7,877,286 B1 * | 1/2011 | Neal | G06Q 30/02 705/20 |
| 7,921,061 B2 * | 4/2011 | Rangarajan et al. | 705/7.35 |
| 7,996,331 B1 * | 8/2011 | Solanki | G06Q 10/04 705/1.1 |
| 8,374,906 B1 * | 2/2013 | Williams et al. | 705/7.35 |
| 2003/0115090 A1 * | 6/2003 | Mujtaba | G06Q 10/06 705/7.31 |
| 2007/0027745 A1 | 2/2007 | Ouimet | |
| 2009/0063251 A1 * | 3/2009 | Rangarajan | G06Q 10/06375 705/7.31 |
| 2009/0210355 A1 | 8/2009 | Dagum et al. | |

(Continued)

OTHER PUBLICATIONS

"Developing Optimal Pricing and Inventory Policies for Retailer who face Uncertain Demand", by Subrahmanyan et al., Journal of Retailing, vol. 72, No. 1, p. 7, Spring 1996.*

(Continued)

*Primary Examiner* — Pan G Choy
(74) *Attorney, Agent, or Firm* — Potomac Law Group, PLLC (57) ABSTRACT

A system for determining product pricing for a product category receives a non-linear problem for the product category, in which the non-linear problem includes a demand model. For a plurality of pair of products in the product category, the system determines coefficients for a change in demand of a first product when a price of a second product is changed. The system then generates an approximate Mixed Integer Linear Programming ("MILP") problem that includes a change of demand based on a sum of the determined coefficients. The system then solves the MILP problem to obtain a MILP solution, which provides the product pricing.

18 Claims, 3 Drawing Sheets

(56) References Cited

U.S. PATENT DOCUMENTS

| | | | | |
|---|---|---|---|---|
| 2010/0250329 | A1* | 9/2010 | Sanli | G06Q 10/04 |
| | | | | 705/4 |
| 2014/0200964 | A1* | 7/2014 | Hassanzadeh | G06Q 30/0283 |
| | | | | 705/7.35 |
| 2015/0081393 | A1* | 3/2015 | Cohen | G06Q 30/0206 |
| | | | | 705/7.35 |
| 2017/0116653 | A1* | 4/2017 | Smith | G06Q 10/06 |

OTHER PUBLICATIONS

"Price Competition with the Attraction Demand Model: Existence of unique equilibrium and its stability", by G. Gallego, W. Huh, W. Kang, and R. Phillps, 2006, Manufacturing and Service Operation Management 8(4) 359.*

"Trajectory Optimization using Mixed-Integer Linear Programming", by Arthur George Richards, Master of Science at the Massachusetts Institute of Technology, Jun. 2002.*

"Dynamic Pricing in the Presence of Inventory Considerations: Research Overview, Current Practices, and Future Directions", by W. Elmaghraby and P. Keskinocak, Management Science, vol. 49, No. 10, pp. 1287-1309, 2003.*

"Optimization Models for Renewal Pricing and Expiration Management in the Apartment Industry", by Amruthanand Venkata Sivalenka, the Graduate School of State University of New York at Buffalo, May 24, 2010.*

"New Product Varieties and the Measurement of International Price", by Robert C. Feenstra, American Economic Review, 1994, 84 (1), p. 157-177.*

"Price, Quality, and Variety Measuring the Gains from Trade in Differentiated Products", by Gloria Sheu, Harvard University; Apr. 2010.*

"Optimization Ordering and Pricing Policies in a Single-Period Environment with Multivariate Demand and Markdowns", by Timothy L. Urban and R.C. Baker, European Journal of Operational Research 103, 1997, p. 573-583.*

"Price Competition Under Multinomial Logit Demand Functions with Random Coefficients", by Allon et al., Feb. 11, 2010; Columbia University, Graduate School of Business.*

"A Model of Sales", by Hal R. Varian, the American Economic Review, vol. 70, Issue 4 (Sep. 1980), pp. 651-659.*

"A Logit Model of Brand Choice Calibrated on Scanner Data", by Peter M. Guadagni and John D. Little, Marketing Science, vol. 2, No. 3 (Summer, 1983), pp. 203-238.*

"A Fractional Programming Approach for Retail Category Price Optimization", by Shivaram Subramanian and Hanif D. Sherali, Springer Science and Business Media, LLC, Nov. 2009.*

Y.K. Tse; "A Diagnostic Test for the Multinomial Logit Model"; Journal of Business & Economic Statistics; Apr. 1987; vol. 5 No. 2; pp. 283-286.

Ward Hanson et al.; "Optimizing Multinomial Logit Profit Functions"; Managment Science; vol. 42 No. 7; Jul. 1996; pp. 992-1003.

David J. Reibstein et al.; "Optimal Product Line Pricing: the Influence of Elasticities and Cross-Elasticities"; Journal of Marketing Research; vol. XXI; Aug. 1984; pp. 259-267.

Shivaram Subramanian et al.; "A fractional programming approach for retail category price optimization"; © Springer Science+Business Media, LLC; Nov. 21, 2009; pp. 263-277.

Dominique M. Hanssens et al.; "Market Response Models and Marketing Practice"; Applied Stochastic Models in Business and Industry; 2005; 21:423-434; published online in Wiley InterScience; www.interscience.wiley.com; DOI: 10.1002/asmb.584; Copyright © 2005 John Wiley & Sons, Ltd.

Wedad Elmaghraby et al.; "Dynamic Pricing in the Presence of Inbentory Considerations: Research Overview, Current Practives, and Future Directions"; School of Industrial and Systems Engineering, Georgia Institute of Technology, Atlanta, Georgia 30332; Management Science © 2003 Informs, vol. 49, No. 10, Oct. 2003; pp. 1287-1309.

Peter M. Guadagni et al.,; "A Logit Model of Brand Choice Calibrated on Scanner Data*"; Marketing Science, vol. 2, No. 3, Summer 1983, printed in U.S.A.; copyright © 1983, The Institute of Management Sciences; pp. 203-238.

Kalyan T. Talluri et al; "The theory and practice of revenue management"; chapter 5: dynamic pricing; pp. 175-239; Springer; 2005.

* cited by examiner

PRODUCT PRICING OPTIMIZER

FIELD

One embodiment is directed generally to a computer system, and in particular to a computer system that optimizes product pricing.

BACKGROUND INFORMATION

Product line pricing is an important business problem faced by retailers and other sellers of merchandise who employ dynamic pricing strategies to generate incremental revenue benefits throughout the year. Retailers, among others, have in increasing numbers begun to utilize decision support systems that leverage the large volume of detailed demand data to automate and optimize pricing recommendations. In particular, the statistical modeling of the price elasticity of items based on analyzing the effect of price changes of one product on its demand, or the demand for another product, can be used to optimize the pricing of products.

Known price optimizers, in general, are given a set of items in a product category together with their current prices and demand cross-elasticity. The optimizers then find a new set of prices that would satisfy all business rules and maximize the profit margin by taking into account some soft price constraints and allowed prices.

SUMMARY

One embodiment is a system for determining product pricing for a product category. The system receives a nonlinear problem for the product category, in which the nonlinear problem includes a demand model. For a plurality of pair of products in the product category, the system determines coefficients for a change in demand of a first product when a price of a second product is changed. The system then generates an approximate Mixed Integer Linear Programming ("MILP") problem that includes a change of demand based on a sum of the determined coefficients. The system then solves the MILP problem to obtain a MILP solution, which provides the product pricing.

DETAILED DESCRIPTION

One embodiment is a price optimizer that optimizes prices for product items in a given merchandise category to maximize the total revenue subject to linear constraints. The optimizer determines, for a pair of products, a set of coefficients that express the changes in demand when the price of one product is changed. Using the coefficients, an approximate linear Mixed Integer Linear Programming ("MILP") problem is formulated in place of the original, non-linear demand problem, which can then be solved to determine the optimized prices.

In general, one embodiment is a price optimizer that calculates a set of recommended prices or validates a set of user-defined input prices, given the following inputs:
a. Sales and cost data for a given demand group and location;
b. Current prices and competitor prices per demand group;
c. Pricing and competition constraints per demand group;
d. Goals for sales, revenue, gross-margin, and competitive price index (CPI) per demand group;
e. Weighted objective function that is a linear combination of the sales, revenue, gross-margin, and CPI per demand group;
f. Choice of the demand forecast model; and
g. Certain demand model parameters for the chosen forecast model.

Many real-world optimization problems are formulated to minimize or maximize a nonlinear function of discrete variables subject to certain constraints involving that function or some linear functions of its arguments. An example of this problem type is the maximization of the total revenue for several merchandise items in a category where demand for each item is expressed as a nonlinear function of all item prices, which can take values only from specific price ladders (i.e., a set of allowed prices). This product pricing revenue maximization problem can be stated as follows: Find the best prices $(p_1, \ldots, p_n)$ for the n product items in a given merchandise category to maximize the total revenue subject to certain linear constraints when demand for the $i^{th}$ item is expressed as a given demand function $d_i(p_1, \ldots, p_n)$ (i.e., a demand model). The problem can also be expressed as follows:

$$\max \quad \sum_{i=1}^{n} p_i d_i(p_1, \ldots, p_n) \tag{1}$$

$$\text{subject to} \quad p_i \in \{p_i^1, \ldots, p_i^{M_i}\} \equiv P_i \tag{2}$$

$$i = 1, \ldots, n$$

$$(p_1, \ldots, p_n) \in L_p \tag{3}$$

$$(d_1, \ldots, d_n) \in L_d$$

$$(p_1 d_1, \ldots, p_n d_n) \in L_r$$

where $d_i(p_1, \ldots, p_n)$ is a nonlinear expression for the $i^{th}$ item demand as a function of all prices in the category; $P_i$ is the price ladder (discrete set) for the $i^{th}$ item; and $L_p$ ($L_d, L_r$) are the feasible price (demand and revenue, respectively) regions defined by the linear inter-item constraints.

This class of problems is known to be difficult to solve to optimality and even finding a high-quality approximate solution is generally intractable. Since the demand function is typically not assumed to be convex or concave, these problems also are not typically solvable by gradient methods even if the price ladder constraint is relaxed and price variables are considered continuous.

Two known examples of modeling product demand as a function of product prices include the "SCAN*PRO" demand model, disclosed for example in K. Talluri and G. Van Ryzin, "*The Theory and Practice of Revenue Management*", Chapter 5, Springer 2005 and the multinomial logit ("MNL") choice-based demand model disclosed in S. Subramanian and H. Sherali, "*A fractional programming approach for retail category price optimization*", Journal of Global Optimization (2010) 48:263-277 ("Subramanian").

In the SCAN*PRO demand model, the demand for the $i^{th}$ item is expressed as $$d_i(p_1, \ldots, p_n) = d_i^0 \prod_{j=1}^{n} \left(\frac{p_j}{p_j^0}\right)^{\gamma_{ij}}$$

where $d_i^0$ is demand at initial prices $(p_1^0, \ldots, p_n^0)$.

In the MNL choice-based demand model, the demand is expressed as $$d_i(p_1, \ldots, p_n) = \frac{e^{U_i(p_i)}}{\sum_{j=1}^{n} e^{U_j(p_j)}} \theta(p_1, \ldots, p_n)$$

where $U_i(p_i)$ is a utility function based on price $p_i$ of the $i^{th}$ item and $\theta(p_1, \ldots, p_n)$ is the calibration parameter based on all product prices.

In known product pricing optimizers that generate optimized prices, the optimization problem shown in equations (1-3) above is solved by a series of greedy searches, which sometimes delivers a solution far from optimal. Other known approaches are based on linear or quadratic approximations of the nonlinear demand function. However, these approaches tend to suffer from insufficient accuracy (linear approximation) or an overwhelming number of integer variables needed to formulate the problem.

In Subramanian, the disclosed algorithm is designed to solve the optimization problem for the MNL-based demand model by relying on transformed variables and a piecewise linear approximation. However, this approach depends on the properties of the specific functional form for demand, in this case, the MNL.

In contrast with known price optimizers, embodiments of the present invention are applicable to all demand models, even to those without an explicit closed-form expression for the demand function, $d_i(p_1, \ldots, p_n)$. Embodiments obtain a high-quality approximate solution to the optimization problem of equations (1-3) above by taking advantage of the discrete nature of the variables. Further, embodiments work for a much more general class of problems, and are not limited to pricing problems of the form of equations (1-3).

Figure 1:
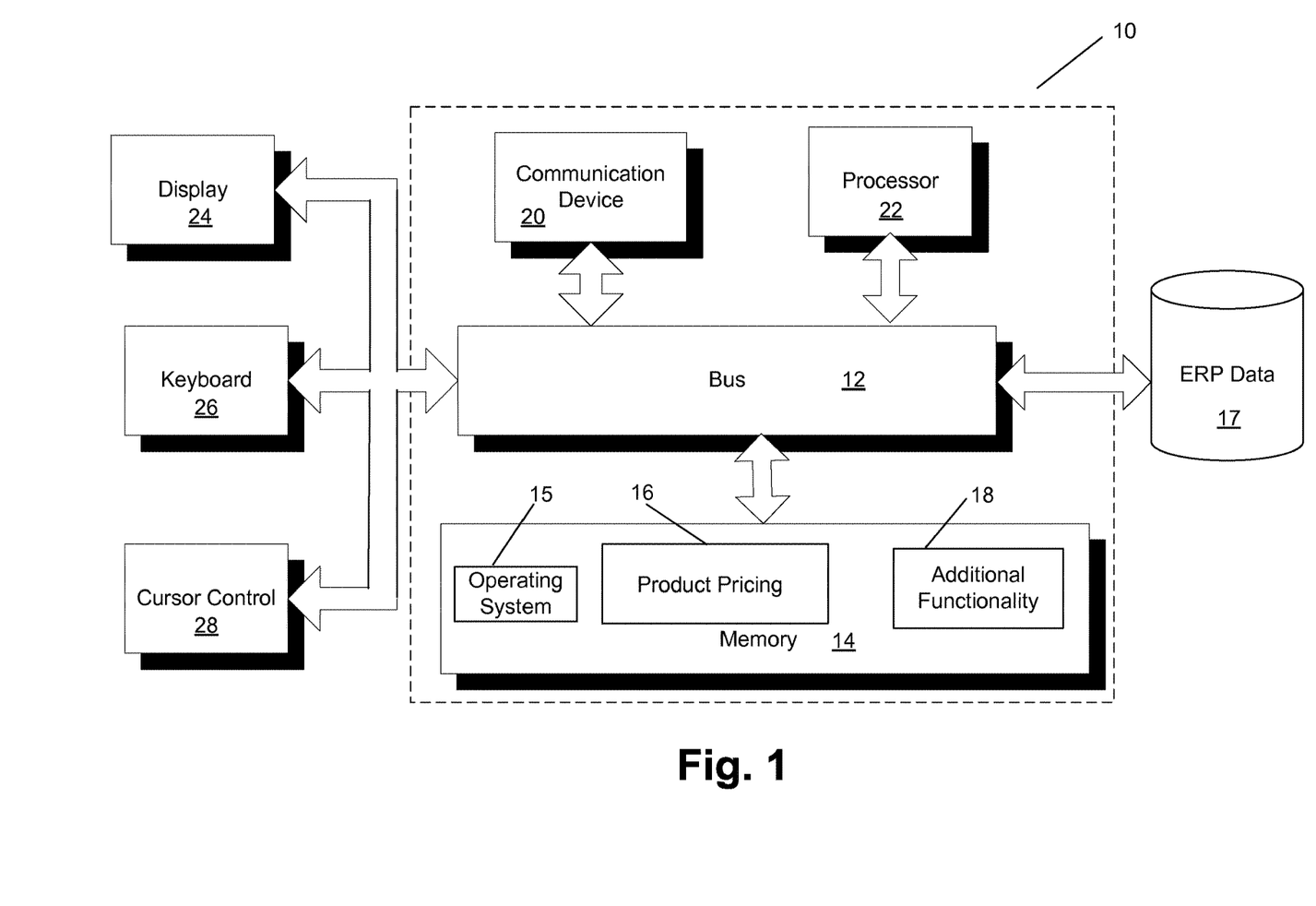
FIG. 1 is a block diagram of a computer system that can implement an embodiment of the present invention.

FIG. 1 is a block diagram of a computer system 10 that can implement an embodiment of the present invention. Although shown as a single system, the functionality of system 10 can be implemented as a distributed system. System 10 includes a bus 12 or other communication mechanism for communicating information, and a processor 22 coupled to bus 12 for processing information. Processor 22 may be any type of general or specific purpose processor. System 10 further includes a memory 14 for storing information and instructions to be executed by processor 22. Memory 14 can be comprised of any combination of random access memory ("RAM"), read only memory ("ROM"), static storage such as a magnetic or optical disk, or any other type of computer readable media. System 10 further includes a communication device 20, such as a network interface card, to provide access to a network. Therefore, a user may interface with system 10 directly, or remotely through a network or any other method.

Computer readable media may be any available media that can be accessed by processor 22 and includes both volatile and nonvolatile media, removable and non-removable media, and communication media. Communication media may include computer readable instructions, data structures, program modules or other data in a modulated data signal such as a carrier wave or other transport mechanism and includes any information delivery media.

Processor 22 is further coupled via bus 12 to a display 24, such as a Liquid Crystal Display ("LCD"), for displaying information to a user. A keyboard 26 and a cursor control device 28, such as a computer mouse, is further coupled to bus 12 to enable a user to interface with system 10.

In one embodiment, memory 14 stores software modules that provide functionality when executed by processor 22. The modules include an operating system 15 that provides operating system functionality for system 10. The modules further include a product pricing module 16 that generates optimized product pricing, as disclosed in more detail below. System 10 can be part of a larger system, such as an enterprise resource planning ("ERP") system. Therefore, system 10 will typically include one or more additional functional modules 18 to include the additional functionality. A database 17 is coupled to bus 12 to provide centralized storage for modules 16 and 18 and store pricing information, inventory information, ERP data, etc.

In one embodiment, a revenue maximization problem is developed and solved for category pricing in the retail industry. However, in other embodiments this problem can be used for any type of product pricing. For the retail embodiment, consider a retailer who has to set the baseline (or regular) price levels for some or all active items in a given category for the next few months, as part of a merchandise planning process. The category manager has to make multiple, coordinated pricing decisions, proactively taking into account the impact of a price change on the sales of other items within the category, as well as any (extraneous) market response. Moreover, the recommended prices have to satisfy several category-level objectives such as profitability, sales, and revenue (e.g., to maximize gross margin while ensuring that the total sales and revenue are within 10% of the current value), and have to be selected from within a limited discrete price ladder (e.g., be within 20% of the current price and end with '9' cents). In addition, items have to be priced relative to certain attributes such as brand type (e.g., a store brand tomato soup should be at least a dollar less than the price of the corresponding national brand), and quantity (e.g., a six-pack of diet-soda versus a two-liter bottle of diet-soda), among others.

Items can represent stock-keeping units ("SKU"s), product subclasses, or product classes within the category, depending on the level of aggregation in the merchandise hierarchy at which the analysis is performed by the category manager. For simplicity, it is assumed that prices of SKUs are optimized at the store-level of the location hierarchy. However, in other embodiments, the problem can be readily extended to manage higher levels of aggregation (e.g., at the zonal level). Further, the problem can address more general situations faced by category managers such as the need to jointly optimize multiple categories that are inter-linked by pricing constraints and/or objectives, or manage several distinct subsets of substitutable items within the same category.

In one embodiment, the potentially infeasible demand model of equations (1-3) above, $(p_1^0, \ldots, p_n^0)$, is used and the objective is to find a new price vector in the vicinity of the initial solution in order to generate optimal pricing. However, in other embodiments different demand models can be used.

In one embodiment, $d_i^0$ is denoted as the current demand value (i.e., $d_i^0 \equiv d_i(p_1^0, \ldots, p_n^0)$). The following set of coefficients are then generated to express the difference between demand when only one price is changed, and the current demand:

$$b_{ij}^m = d_i(p_1^0, \ldots, p_{j-1}^0, p_j^m, p_{j+1}^0, \ldots, p_n^0) - d_i^0.$$

Embodiments further generate binary decision variables $x_i^m$ that indicate whether the $i^{th}$ price variable was assigned to the $m^{th}$ price in its ladder:

$$x_i^m = \begin{cases} 1 & \text{if } p_i = p_i^m, \\ 0 & \text{otherwise.} \end{cases}$$

A similar set of continuous auxiliary variables $y_i^m$ are also generated.

Embodiments then generate the following Mixed Integer Linear Programming ("MILP") problem:

$$\max \quad \sum_{i=1}^{n} \sum_{m=1}^{M_i} p_i^m y_i^m \quad (4)$$

$$\text{subject to} \quad \sum_{m=1}^{M_i} x_i^m = 1, \; i = 1, \ldots, n \quad (5)$$

$$\sum_{m=1}^{M_i} y_i^m = d_i^0 + \sum_{j=1}^{n} \sum_{m=1}^{M_j} b_{ij}^m x_j^m \; i = 1, \ldots, n \quad (6)$$

$$0 \le y_i^m \le d_i^{max} x_i^m \; i = 1, \ldots, n \quad (7)$$

$$x_i^m \in \{0, 1\} \; i = 1, \ldots, n; m = 1, \ldots, M_i \quad (8)$$

$$\left( \sum_{m=1}^{M_1} p_1^m x_1^m, \ldots, \sum_{m=1}^{M_n} p_n^m x_n^m \right) \in L_p \quad (9)$$

$$\left( \sum_{m=1}^{M_1} y_1^m, \ldots, \sum_{m=1}^{M_n} y_n^m \right) \in L_d$$

$$\left( \sum_{m=1}^{M_1} p_1^m y_1^m, \ldots, \sum_{m=1}^{M_n} p_n^m y_n^m \right) \in L_r$$

The solution to the problem of equations (4-9) above serves as an approximation to the exact solution of the original optimization problem of equations (1-3) above, and can therefore be used to generate optimized prices. Specifically, constraints (5) guarantee that exactly one $x_i^m$ variable is equal to one for each i, which by means of constraint (7) implies that only one $y_i^m$ variable is non-zero. The constraint (6) ensures that the non-zero $y_i^m$ variable is equal to the demand approximation. Finally, constraints (9) correspond to the constraints (3) in the original formulation.

The MILP problem of equations (4-9) can be solved by any widely available and known MILP solver within the time frame acceptable for most practical applications. The solution to the MILP problem can be converted to the optimized product prices as follows: for all $$i = 1, \ldots, n : p_i = \sum_{m=1}^{M_i} p_i^m x_i^m.$$

Figure 2:
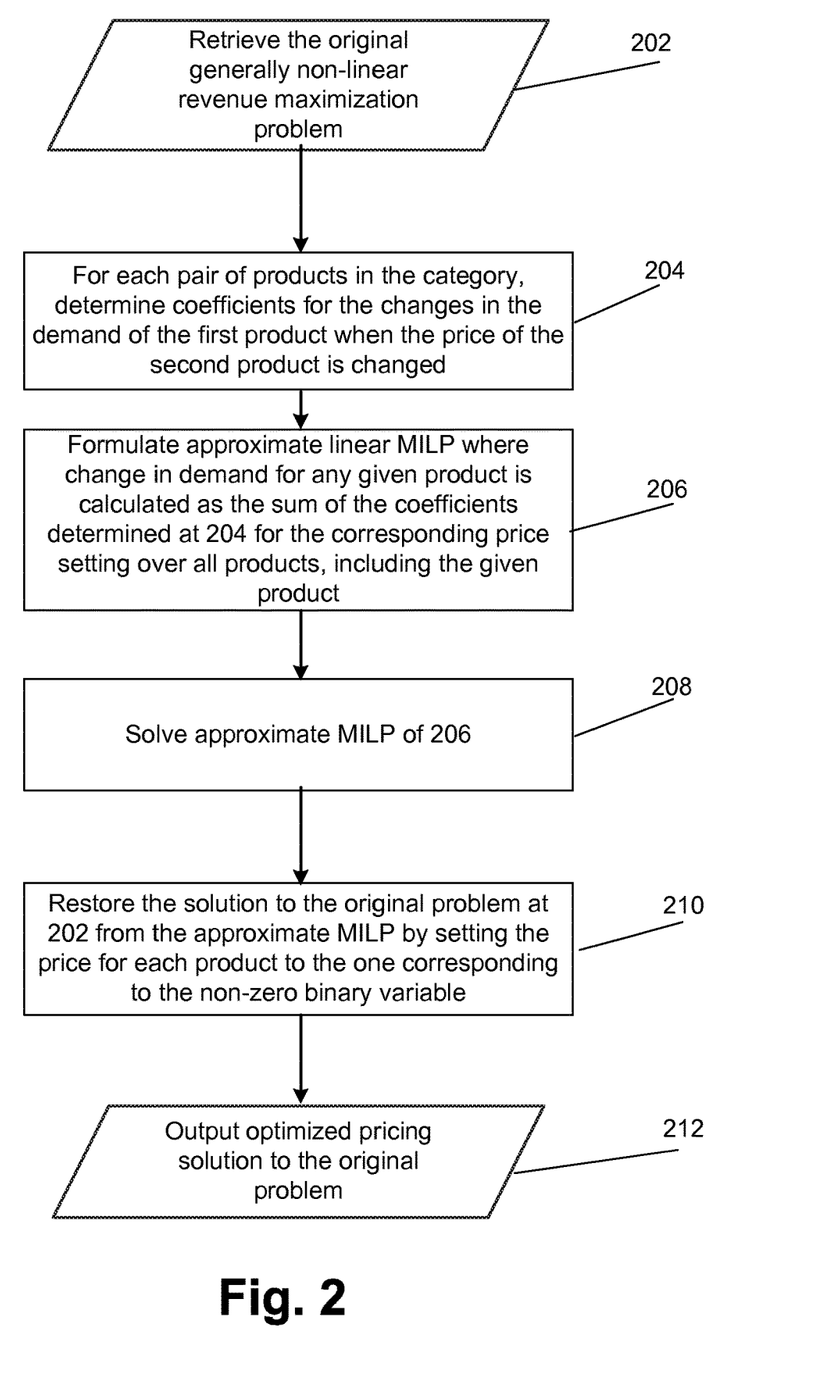
FIG. 2 is a flow diagram of the functionality of a product pricing module of FIG. 1 when generating optimized product pricing in accordance with one embodiment.

FIG. 2 is a flow diagram of the functionality of product pricing module 16 of FIG. 1 when generating optimized product pricing in accordance with one embodiment. In one embodiment, the functionality of the flow diagram of FIG. 2 is implemented by software stored in memory or other computer readable or tangible medium, and executed by a processor. In other embodiments, the functionality may be performed by hardware (e.g., through the use of an application specific integrated circuit ("ASIC"), a programmable gate array ("PGA"), a field programmable gate array ("FPGA"), etc.), or any combination of hardware and software.

At 202, the original, generally non-linear revenue maximization problem is read from the input stream or retrieved from memory. In one embodiment, the revenue maximization problem is the problem of equations (1-3) above, and includes a demand model. However, other problems/demand models can be used. In one embodiment, the revenue is maximized for several merchandise items in a category, where demand for each item is expressed as a nonlinear function of all item prices, which can take values only from specific price ladders (i.e., a set of allowed prices).

At 204, for each pair of products in the category, coefficients are determined for the changes in the demand of the first product when the price of the second product is changed from the base (usually initial) level to various other levels in the price ladder of the second product. In general, these coefficients are computed for all $n^2$ pairs of n products in the category. However, in most practical cases, the product pairs with mutual non-zero price-demand effects are limited to related products. For example, different packaging of the same product or organic and ordinary versions of a grocery item with the same brand and flavor. These coefficients will be usually relatively large when dependency of a particular product demand on its own price is considered (i.e., when the first and the second products in the pair are the same). In contrast, when the products are different, the corresponding demand changing coefficients are relatively small reflecting relatively weak cross product effect. In one embodiment, the coefficients, which express the difference between demand when only one price is changed, and the current demand is expressed as follows: $b_{ij}^m = d_i(p_1^0, \ldots, p_{j-1}^0, p_j^m, p_{j+1}^0, \ldots, p_n^0) - d_i^0$. Embodiments further generate binary decision variables $x_i^m$ and a similar set of continuous auxiliary variables $y_i^m$.

At 206, an approximate MILP is formulated where change in demand for any given product is calculated as the sum of the coefficients determined at 204 for the corresponding price setting over all products, including the given product. All other constraints of the original problem are linear by definition and do not need to be changed.

At 208, the approximate MILP of 206 is solved using any known MILP solver.

At 210, the solution to the original problem at 202 is restored from the approximate MILP by setting the price for each product to the one corresponding to the non-zero binary variable. The constraints of the approximate MILP guarantee that, for each product, only one binary variable indicating the optimal price in the price ladder is set to one while the others are set to zero. In one embodiment, the solution to the MILP problem can be converted to the optimized product prices as follows: for all $$i = 1, \ldots, n : p_i = \sum_{m=1}^{M_i} p_i^m x_i^m.$$

At 212, the optimized pricing solution to the original problem is written to the output stream for reporting and other interface purposes and for determining optimized prices.

The effectiveness of embodiments of the invention can be shown by comparing embodiments with a standard linear approximation approach based on the known first-degree Taylor expansion disclosed in, for example, M. Greenberg, "*Advanced Engineering Mathematics (2nd ed.)*", Prentice Hall (1998). Using the Taylor expansion, the $b_{ij}^m$ coefficients disclosed above become:

$$b_{ij}^m = \frac{\partial d_i(p_1^0, \ldots, p_n^0)}{\partial p_j}(p_j^m - p_j^0).$$

The difference in the approximations can be shown by comparing the traditional approximation by linearization to the embodiments of the invention for a demand model of: $d_1(p_1,p_2,p_3) = p_1^{-1} p_2^{0.1} p_3^{0.1}$, which is the special case of the SCAN*PRO demand model disclosed above.

Figure 3A:
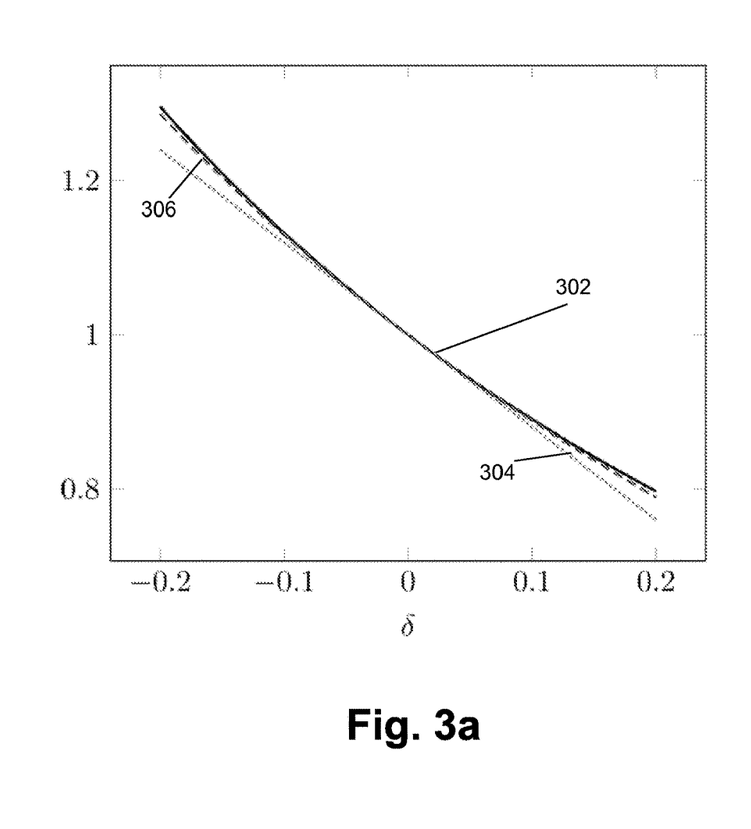
FIGS. 3a and 3b are graphs that illustrates a comparison of the approximation of embodiments of the present invention with the Taylor approximation
Figure 3B:
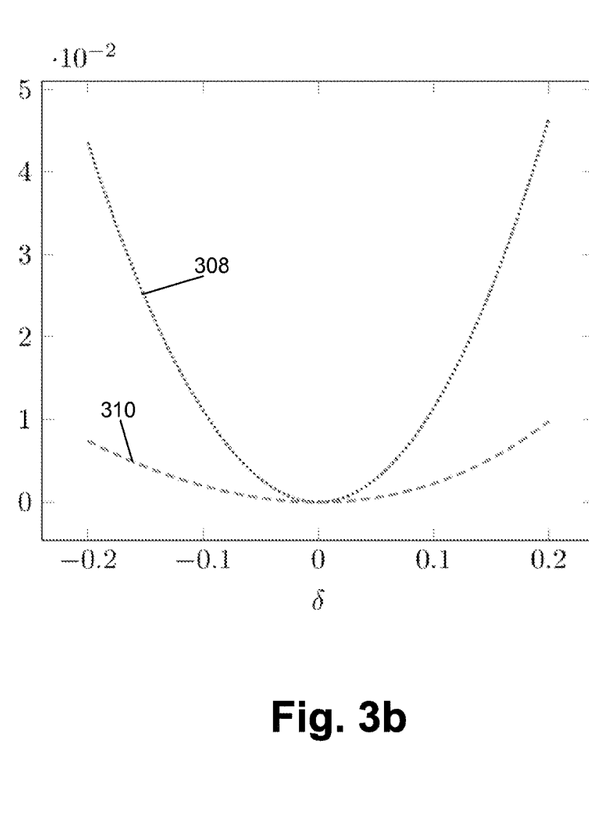

The demand is approximated along the line $(1+\delta, 1-\delta, 1-\delta)$ for $\delta \in [-0.2, 0.2]$. FIGS. 3a and 3b are graphs that illustrates a comparison of the approximation of embodiments of the present invention with the Taylor approximation. In FIG. 3a, solid line 302 is the true demand, dotted line 304 is the Taylor approximation, and dashed line 306 is the approximation in accordance with embodiments of the invention. In FIG. 3b, dotted line 308 is the Taylor approximation error, and dotted line 310 is the error in accordance with embodiments of the invention. As shown, the approximation in accordance with embodiments of the present invention is significantly more accurate than the approximation based on the linearization using the Taylor approximation.

As disclosed, embodiments provide optimized pricing for a pair of products by determining coefficients that express a change of demand of one product when the price of the other product has changed. A MILP problem is then formulated using the coefficients, and then solved. As a result, an optimal or near optimal solution to the demand/pricing problem can be determined relatively quickly.

Several embodiments are specifically illustrated and/or described herein. However, it will be appreciated that modifications and variations of the disclosed embodiments are covered by the above teachings and within the purview of the appended claims without departing from the spirit and intended scope of the invention.

What is claimed is:

1. A non-transitory computer readable medium having instructions stored thereon that, when executed by a processor, cause the processor to determine product pricing for a product category, the determine product pricing comprising:

receiving a non-linear problem for the product category, wherein the non-linear problem comprises a demand model;

for a pair of products in the product category, determining coefficients for a change in demand of a first product of the pair when a price of a second product of the pair is changed to one or more different price levels on a second product price ladder, and repeating the determining coefficients for at least all related pair of products in the product category;

generating binary decision variables that indicate whether price variables were assigned to a price on a corresponding price ladder;

generating an approximate Mixed Integer Linear Programming (MILP) problem wherein a change of demand for each product is based on a sum of the determined coefficients;

solving the MILP problem using the binary decision variables to obtain a MILP solution; and converting the MILP solution into the product pricing, wherein the price for each product is set to a corresponding generated binary decision variable.

2. The computer readable medium of claim 1, wherein the non-linear problem comprises assigning prices on products from a price ladder.

3. The computer readable medium of claim 1, wherein the non-linear problem comprises:

$$\max \quad \sum_{i=1}^{n} p_i d_i(p_1, \ldots, p_n)$$

$$\text{subject to} \quad p_i \in \{p_i^1, \ldots, p_i^{M_i}\} \equiv P_i \quad i = 1, \ldots, n$$

$$(p_1, \ldots, p_n) \in L_p$$

$$(d_1, \ldots, d_n) \in L_d$$

$$(p_1 d_1, \ldots, p_n d_n) \in L_r$$

where $d_i(p_1, \ldots, p_n)$ is a non-linear expression for the $i^{th}$ item demand as a function of all prices in the product category, $P_i$ is a price ladder for the $i^{th}$ item, and $L_p$ ($L_d, L_r$) are price regions defined by linear inter-item constraints.

4. The computer readable medium of claim 3, wherein $d_i^0 \equiv d_i(p_1^0, \ldots, p_n^0)$ and the determined coefficients comprise:

$$b_{ij}^m = d_i(p_1^0, \ldots, p_{j-1}^0, p_j^m, p_{j+1}^0, \ldots, p_n^0) - d_i^0.$$

5. The computer readable medium of claim 4, wherein the MILP problem comprises:

$$\max \quad \sum_{i=1}^{n} \sum_{m=1}^{M_i} p_i^m y_i^m$$

$$\text{subject to} \quad \sum_{m=1}^{M_i} x_i^m = 1, i = 1, \ldots, n$$

$$\sum_{m=1}^{M_i} y_i^m = d_i^0 + \sum_{j=1}^{n} \sum_{m=1}^{M_j} b_{ij}^m x_j^m \quad i = 1, \ldots, n$$

$$0 \le y_i^m \le d_i^{max} x_i^m \quad i = 1, \ldots, n$$

$$x_i^m \in \{0, 1\} \quad i = 1, \ldots, n; m = 1, \ldots, M_i$$

$$\left(\sum_{m=1}^{M_1} p_1^m x_1^m, \ldots, \sum_{m=1}^{M_n} p_n^m x_n^m\right) \in L_p$$

$$\left(\sum_{m=1}^{M_1} y_1^m, \ldots, \sum_{m=1}^{M_n} y_n^m\right) \in L_d$$

$$\left(\sum_{m=1}^{M_1} p_1^m y_1^m, \ldots, \sum_{m=1}^{M_n} p_n^m y_n^m\right) \in L_r.$$

6. The computer readable medium of claim 1, the converting comprising, for all $$i = 1, \ldots, n : p_i = \sum_{m=1}^{M_i} p_i^m x_i^m.$$

7. A computer implemented method for determining product pricing for a product category, the method comprising:
receiving a non-linear problem for the product category, wherein each pair of products have mutual non-zero price-demand effects, wherein the non-linear problem comprises a demand model;
for a pair of products in the product category, determining coefficients for a change in demand of a first product of the pair when a price of a second product of the pair is changed to one or more different price levels on a second product price ladder, and repeating the determining coefficients for at least all related pair of products in the product category;
generating binary decision variables that indicate whether price variables were assigned to a price on a corresponding price ladder;
generating an approximate Mixed Integer Linear Programming (MILP) problem wherein a change of demand for each product is based on a sum of the determined coefficients;
solving the MILP problem using the binary decision variables to obtain a MILP solution; and
converting the MILP solution into the product pricing, wherein the price for each product is set to a corresponding generated binary decision variable.

8. The method of claim 7, wherein the non-linear problem comprises assigning prices on products from a price ladder.

9. The method of claim 7, wherein the non-linear problem comprises:

$$\max \quad \sum_{i=1}^{n} p_i d_i(p_1, \ldots, p_n)$$
$$\text{subject to} \quad p_i \in \{p_i^1, \ldots, p_i^{M_i}\} \equiv P_i \quad i = 1, \ldots, n$$
$$(p_1, \ldots, p_n) \in L_p$$
$$(d_1, \ldots, d_n) \in L_d$$
$$(p_1 d_1, \ldots, p_n d_n) \in L_r$$

where $d_i(p_1, \ldots, p_n)$ is a non-linear expression for the $i^{th}$ item demand as a function of all prices in the product category, $P_i$ is a price ladder for the $i^{th}$ item, and $L_p(L_d, L_r)$ are price regions defined by linear inter-item constraints.

10. The method of claim 9, wherein $d_i^0 \equiv d_i(p_1^0, \ldots, p_n^0)$ and the determined coefficients comprise:

$$b_{ij}^m = d_i(p_1^0, \ldots, p_{j-1}^0, p_j^m, p_{j+1}^0, \ldots, p_n^0) - d_i^0.$$

11. The method of claim 10, wherein the MILP problem comprises:

$$\max \quad \sum_{i=1}^{n} \sum_{m=1}^{M_i} p_i^m y_i^m$$
$$\text{subject to} \quad \sum_{m=1}^{M_i} x_i^m = 1, \; i = 1, \ldots, n$$

$$\sum_{m=1}^{M_i} y_i^m = d_i^0 + \sum_{j=1}^{n} \sum_{m=1}^{M_j} b_{ij}^m x_j^m \quad i = 1, \ldots, n$$
$$0 \le y_i^m \le d_i^{max} x_i^m \quad i = 1, \ldots, n$$
$$x_i^m \in \{0, 1\} \quad i = 1, \ldots, n; m = 1, \ldots, M_i$$
$$\left(\sum_{m=1}^{M_1} p_1^m x_1^m, \ldots, \sum_{m=1}^{M_n} p_n^m x_n^m\right) \in L_p$$
$$\left(\sum_{m=1}^{M_1} y_1^m, \ldots, \sum_{m=1}^{M_n} y_n^m\right) \in L_d$$
$$\left(\sum_{m=1}^{M_1} p_1^m y_1^m, \ldots, \sum_{m=1}^{M_n} p_n^m y_n^m\right) \in L_r.$$

12. The method of claim 7, the converting comprising, for all $$i = 1, \ldots, n : p_i = \sum_{m=1}^{M_i} p_i^m x_i^m.$$

13. A product pricing optimization system that determines product pricing for a product category in response to receiving a non-linear problem for the product category, wherein the non-linear problem comprises a demand model, the system comprising:
a processor;
a non-transitory computer-readable memory coupled to the processor and storing instructions that when executed by the processor comprise:
a coefficient generator that, for a pair of products in the product category, determines coefficients for a change in demand of a first product of the pair when a price of a second product of the pair is changed to one or more different price levels on a second product price ladder, and repeating the determining coefficients for at least all related pair of products in the product category;
a decision variable generator that generates binary decision variables that indicate whether price variables were assigned to a price on a corresponding price ladder;
a Mixed Integer Linear Programming (MILP) generator that generates an approximate MILP problem wherein a change of demand for each product is based on a sum of the determined coefficients;
a MILP solver that solves the MILP problem using the binary decision variables to obtain a MILP solution; and
converts the MILP solution into the product pricing, wherein the price for each product is set to a corresponding generated binary decision variable.

14. The system of claim 13, wherein the non-linear problem comprises assigning prices on products from a price ladder.

15. The system of claim 13, wherein the non-linear problem comprises:

$$\max \quad \sum_{i=1}^{n} p_i d_i(p_1, \ldots, p_n)$$

-continued $$\text{subject to } p_i \in \{p_i^1, \ldots, p_i^{M_i}\} \equiv P_i \quad i = 1, \ldots, n$$

$$(p_1, \ldots, p_n) \in L_p$$

$$(d_1, \ldots, d_n) \in L_d$$

$$(p_1 d_1, \ldots, p_n d_n) \in L_r$$

where $d_i(p_1, \ldots, p_n)$ is a non-linear expression for the $i^{th}$ item demand as a function of all prices in the product category, $P_i$ is a price ladder for the $i^{th}$ item, and $L_p$ ($L_d, L_r$) are price regions defined by linear inter-item constraints.

16. The system of claim 15, wherein $d_i^0 \equiv d_i(p_1^0, \ldots, p_n^0)$ and the determined coefficients comprise:

$$b_{ij}^m = d_i(p_1^0, \ldots, p_{j-1}^0, p_j^m, p_{j+1}^0, \ldots, p_n^0) - d_i^0.$$

17. The system of claim 16, wherein the MILP problem comprises:

$$\max \sum_{i=1}^{n} \sum_{m=1}^{M_i} p_i^m y_i^m$$

$$\text{subject to } \sum_{m=1}^{M_i} x_i^m = 1, \, i = 1, \ldots, n$$

-continued $$\sum_{m=1}^{M_i} y_i^m = d_i^0 + \sum_{j=1}^{n} \sum_{m=1}^{M_j} b_{ij}^m x_j^m \quad i = 1, \ldots, n$$

$$0 \leq y_i^m \leq d_i^{max} x_i^m \quad i = 1, \ldots, n$$

$$x_i^m \in \{0, 1\} \quad i = 1, \ldots, n; m = 1, \ldots, M_i$$

$$\left( \sum_{m=1}^{M_1} p_1^m x_1^m, \ldots, \sum_{m=1}^{M_n} p_n^m x_n^m \right) \in L_p$$

$$\left( \sum_{m=1}^{M_1} y_1^m, \ldots, \sum_{m=1}^{M_n} y_n^m \right) \in L_d$$

$$\left( \sum_{m=1}^{M_1} p_1^m y_1^m, \ldots, \sum_{m=1}^{M_n} p_n^m y_n^m \right) \in L_r.$$

18. The system of claim 13, the converting comprising, for all $$i = 1, \ldots, n : p_i = \sum_{m=1}^{M_i} p_i^m x_i^m.$$

* * * * *

UNITED STATES PATENT AND TRADEMARK OFFICE
CERTIFICATE OF CORRECTION

PATENT NO. : 10,095,989 B2
APPLICATION NO. : 13/303235
DATED : October 9, 2018
INVENTOR(S) : Vakhutinsky et al.

It is certified that error appears in the above-identified patent and that said Letters Patent is hereby corrected as shown below:

In the Specification

In Column 1, Line 54, after "approximation" insert -- . --.

In Column 5, Line 2, delete "$p_n^0$)." and insert -- $p_n^0$)). --, therefor.

Signed and Sealed this
Fourteenth Day of January, 2020

Andrei Iancu
*Director of the United States Patent and Trademark Office*